UNITED STATES PATENT OFFICE.

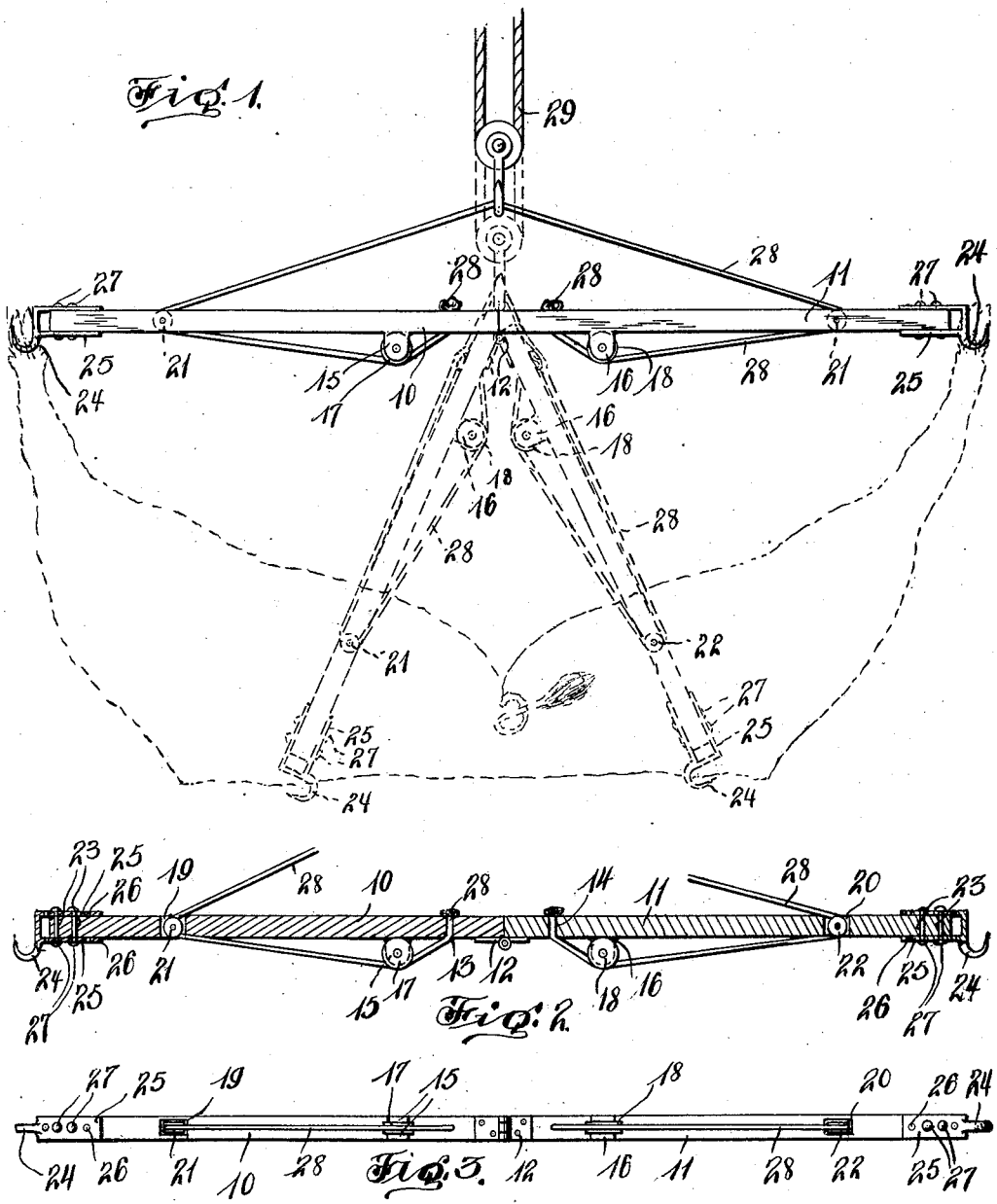

JACOB STAUDENMAIER, OF OLDHAM, SOUTH DAKOTA.

MEAT-SPREADER.

991,383. Specification of Letters Patent. Patented May 2, 1911.

Application filed September 20, 1910. Serial No. 582,899.

*To all whom it may concern:*

Be it known that I, JACOB STAUDENMAIER, a citizen of the United States, residing at Oldham, in the county of Kingsbury, State of South Dakota, have invented certain new and useful Improvements in Meat-Spreaders; and I do hereby declare the following to be a full, clear, and exact description of the invention, such as will enable others skilled in the art to which it appertains to make and use the same.

This invention relates to meat spreaders.

The object of the invention resides in the provision of a device of the character named adapted to be contracted and expanded.

A further object of the invention resides in the provision of a device which will be simple in construction, efficient in use, and comparatively inexpensive to manufacture.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views; and in which, Figure 1 is a front elevation of a meat spreader constructed in accordance with the invention, the same being shown in dotted lines in contracted position and in full lines in expanded position, a portion of a carcass being shown suspended therefrom in dotted lines in the last named position; Fig. 2, is a vertical longitudinal section through the spreader in expanded position; and, Fig. 3, is a bottom view of the spreader in expanded position.

Referring to the drawings, the spreader is shown as comprising a pair of bars 10 and 11 connected together at their adjacent ends by means of a hinge 12 disposed on the lower side of said bars. Formed in each of the bars 10 and 11 adjacent the hinge 12 are openings 13 and 14 respectively, and just outward of these openings each of the bars 10 and 11 is provided on their lower side with spaced ears 15 and 16 respectively. Journaled between the ears 15 is a grooved pulley 17, while a corresponding grooved pulley 18 is journaled between the ears 16. The bars 10 and 11 are further provided in proximity to their free ends with openings 19 and 20 respectively and journaled in these openings are grooved pulleys 21 and 22 respectively. Formed in the extreme outer end of each of the bars 10 and 11 is a plurality of bolt apertures 23 for a purpose that will presently appear. Mounted on each of the free ends of the bars 10 and 11 are hook members 24, the shanks of which are formed with spaced portions 25 which embrace the free ends of the bars 10 and 11. These spaced portions 25 are provided with alining openings 26 which are adapted to register as the hook members are moved longitudinally of their respective bars with the bolt apertures 23, whereby the hook members may be adjusted longitudinally of the bars and secured thereto by means of bolts 27 passing through the openings 26 and the apertures 23.

A flexible cable 28 has its ends extended through the openings 13 and 14 from the lower side of the bars 10 and 11, and knotted as at 28, so as to secure the ends of said cable to the respective bars 10 and 11. The cable is then carried over the pulleys 17 and 18 and also over the pulleys 21 and 22 so that the intermediate portion of the cable will be disposed on the upper sides of the bars 10 and 11. That part of the cable 28 which is disposed on the upper part of the bars 10 and 11 is adapted to be secured to a suitable hoisting device 29 when it is desired to use the spreader.

In operation, the bars 10 and 11 are disposed in the position shown in dotted lines in Fig. 1 and the cable 28 is connected with the hoisting apparatus 29. The rear legs of the carcass are then secured respectively through the hook members 24 and the hoisting apparatus 29 operated to lift the spreader and the carcass carried thereby. During this operation of the hoisting apparatus, the inner ends of the bars 10 and 11 are grasped so as to resist the tendency of said inner ends to move upwardly under the influence of the hoisting apparatus. This operation will serve to actuate the spreader to the position shown in full lines in Fig. 1. As this operation is performed with the spreader at frequent intervals, the pulleys 17 and 18 direct the ends of the cable away from the respective bars 10 and 11 at a considerable angle and relieve said cable from the wear incident to the sharp edges of the openings in said bars through which the terminals of the cable extend. It will be further noted that the pulleys 21 also serve to prevent excessive wear of the cable in its passage through the openings in which said pulleys are mounted as they afford a curved surface on which the cable bears. When the bars 10 and 11 have assumed the position shown in full lines in Fig. 1, their adjacent edges will abut and thus prevent further movement of the bars of the spreader.

What is claimed is:—

1. In a device of the class described, the combination of a pair of bars hingedly connected together at one end and having openings adjacent their free ends, a flexible cable having its terminals extended through said openings respectively, and secured to the respective bars adjacent their inner ends, and a hook member mounted on the free end of each bar.

2. In a device of the class described, the combination of a pair of bars hingedly connected together at one end and having openings adjacent their free ends, a pair of spaced ears on corresponding faces of each of said bars inward of said openings, a pulley journaled between each pair of spaced ears, a pulley journaled in the openings at the free end of each bar, a flexible cable having its terminals extended through said openings respectively and over the pulleys carried by each bar and fixed to the bars adjacent their inner ends, and a hook member mounted on the free end of each bar.

In testimony whereof, I affix my signature, in presence of two witnesses.

JAKE STAUDENMAIER.

Witnesses:
PATRICK KILDEE,
B. M. EGGLESTON.

---

Copies of this patent may be obtained for five cents each, by addressing the "Commissioner of Patents, Washington, D. C."